J. G. McILROY.
LATRINE.
APPLICATION FILED APR. 26, 1918.

1,294,687.

Patented Feb. 18, 1919.
2 SHEETS—SHEET 1.

Inventor
J. G. McIlroy
By McGill and Maguire
his Attorneys

J. G. McILROY.
LATRINE.
APPLICATION FILED APR. 26, 1918.
1,294,687.
Patented Feb. 18, 1919.
2 SHEETS—SHEET 2.
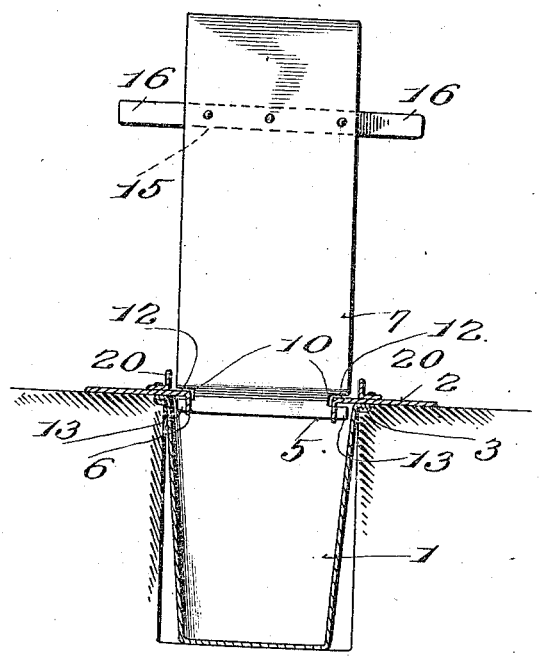
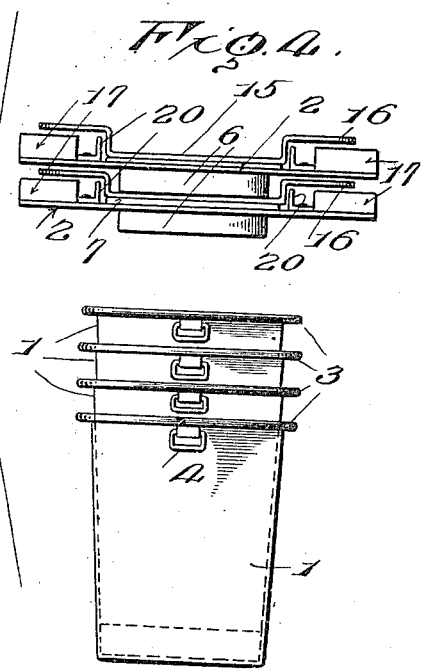
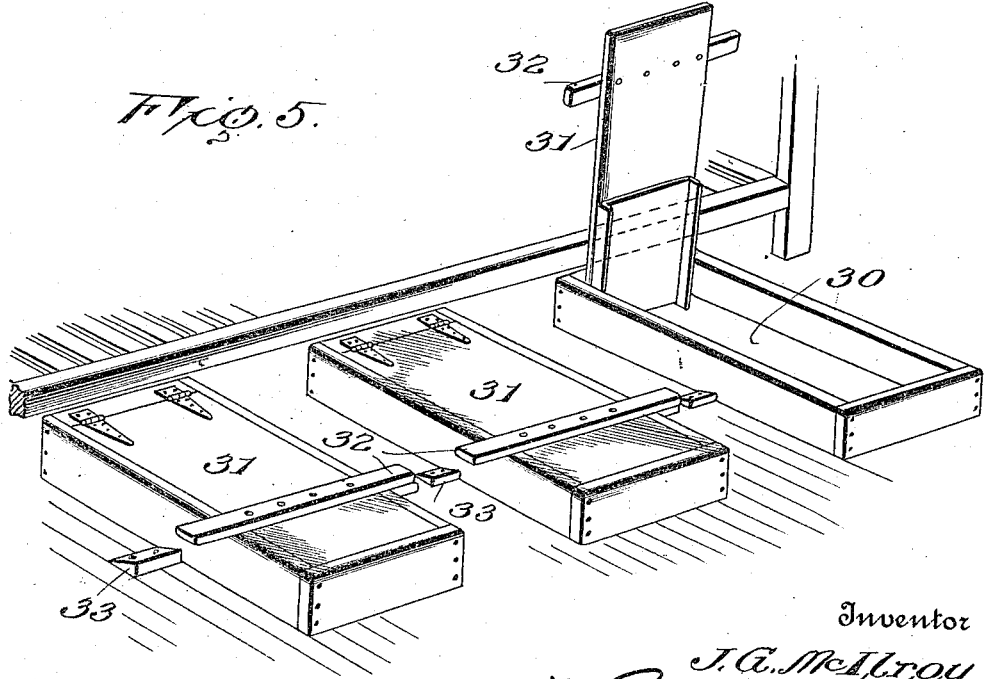
Inventor
J. G. McIlroy

UNITED STATES PATENT OFFICE.

JAMES GARFIELD McILROY, OF THE UNITED STATES ARMY.

LATRINE.

1,294,687. Specification of Letters Patent. Patented Feb. 18, 1919.

Application filed April 26, 1918. Serial No. 230,864.

*To all whom it may concern:*

Be it known that I, JAMES G. MCILROY, of the United States Army, temporarily of Camp Greene, Charlotte, in the county of Mecklenburg and State of North Carolina, have invented certain new and useful Improvements in Latrines; and I do hereby declare the following to be a full, clear, and exact description of the invention, such as will enable others skilled in the art to which it appertains to make and use the same.

My invention relates to latrines, and it is my object to provide a simple, economical and highly efficient device of this character which will make for complete sanitation by preventing the spread of venereal diseases and various human parasites, which are so frequently encountered by an army in the field, as well as in camp life generally, and one which will permit the user to assume a most natural and comfortable position.

A further object is to provide a latrine which may readily be transported, the parts being so arranged that but a minimum amount of space is taken up when the device is dismantled for shipment.

Figure 1:
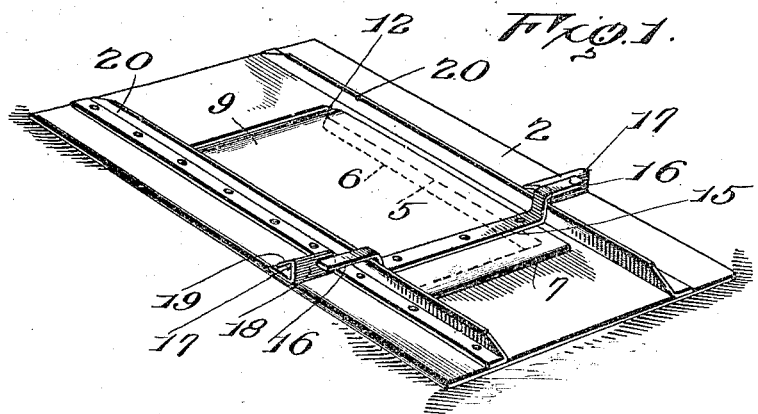
Figure 2:
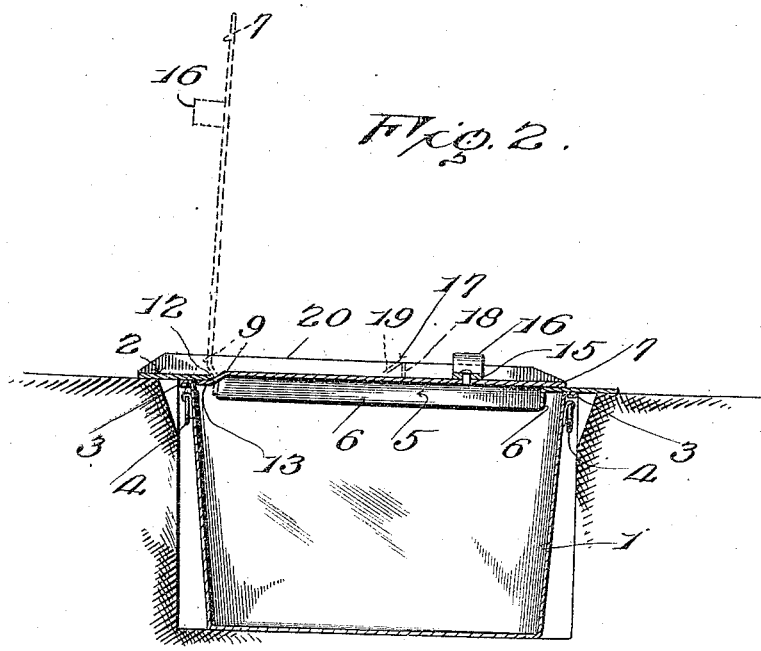

In the drawings, Figure 1 is a view in perspective of my improved latrine. Fig. 2 is a longitudinal sectional view showing the receptacle of the latrine lowered into a pit. Fig. 3 shows the lid in elevated position. Fig. 4 shows several of the receptacles nested and the covers stacked ready for shipment. Fig. 5 shows a modification.

My improved latrine comprises, in the main, a receptacle 1 and a cover 2. These are preferably formed of metal, and I have shown the receptacle of approximately rectangular form, the bottom being of less area than the top. The upper edge of the receptacle is bent outwardly to form a flange 3 on all four sides, the cover 2 being adapted to rest upon this flange. At each end of the receptacle I provide a handle 4.

The cover 2 is of plate like form and has a central oblong opening 5 of slightly less area than the open top of the receptacle 1. The metal adjacent this opening is bent downwardly on three sides to provide flanges 6 which depend into the receptacle and prevent the cover from getting out of alinement. The opening 5 is closed when the latrine is not in use by a lid 7 hinged to the cover. Any preferred form of hinge connection may be used, but I have shown the end 9 of the lid slightly offset and notched at each side at 10 to take in a lipped portion 12 of the cover. The extreme ends 13 of the off-set portion of the lid will, when the latter is opened, bear against the ends of the flanges 6 which so limit the opening movement of the lid as to prevent it being raised to a perpendicular position, thus insuring its return to closed position as soon as released by the user. This depending portion 9 is below the plane of the cover when the lid is raised and serves the added purpose of preventing any fluid passing to the exposed face of the cover at the point of joining of the lid and cover.

Near its free end the lid 7 is provided with a transversely arranged bar 15 the outer ends of which are offset so as to stand up from the lid and cover when the former is raised. These outer ends, which I have designated 16, extend beyond the edges of the lid and afford a ready hand-hold for raising the lid and a gripping portion by which the user may brace the position of his body.

At each side of the opening 5 of the cover is a foot-hold 17 formed of a piece of metal bent to provide a vertical wall 18 and an inclined portion 19, the heel of the user being adapted to engage the wall 18. The cover 2 may be strengthened by the use of longitudinally extending angle irons 20, one being arranged at each side of the opening 5.

The receptacle 1 is adapted to be lowered into a pit, the top being about flush with the surface of the ground. The cover 2 is then placed in position. The user lifts the lid 7 and braces his feet against the footholds 17 and with his hands braces himself in a stooping position. With the exception of the engagement of the lid by the hands, it will be seen that no portion of the body of the user comes in contact with the latrine. At required times the cover 2 may be removed and the receptacle 1 readily lifted from its pit and carried to a common dumping hole or incinerator.

The advantages of my invention are apparent. It will be seen that by using latrines of this construction the spreading of lime in large quantities is avoided, as is the necessity of digging new trenches and holes or new latrines when an old one is filled. Furthermore, and of much importance from a sanitary standpoint, there is no wholesale soiling of the ground by digging of many latrine holes as in permanent trench systems.

While I have described my improved latrine as formed of metal and as a single unit it will be understood that in large permanent or semi-permanent cantonments or other encampments the latrine may be formed in series, a receptacle common to a plurality of openings being provided, the cover in such case being a platform or other form of floor to which the lids may be secured in any preferred manner. In Fig. 5 I have shown such a modified form, the receptacle being designated 30, the lid 31, the hand-holds 32, and the foot-holds 33.

I claim as my invention:

1. A latrine including a platform adapted to support the feet of the user and having an opening, a closure for said opening having a hinged connection with said platform and means adapted to be engaged by the feet and hands of the user for bracing the position of the body.

2. A latrine including a platform adapted to support the feet of the user and having an opening, a closure for said opening having a hinged connection with said platform, and a hand-hold at one end of the closure for lifting it and bracing the user.

3. A latrine including a platform adapted to support the feet of the user and having an opening, a closure for said opening having a hinged connection with said platform, and means on said closure for lifting it, said means when the closure is raised forming a brace for the user.

4. A latrine including a platform adapted to support the feet of the user and having an opening, a closure for said opening having a hinged connection with said platform, and means extending beyond the sides of the closure at one end forming a hand-hold for raising the cover and for bracing the user.

5. A portable latrine including a receptacle, a cover for the receptacle adapted to support the feet of the user and having an opening therein, a hinged closure for said opening, and a hand-hold at one end of the closure for raising it and bracing the user.

6. A portable latrine including a receptacle, a detachable cover for the receptacle adapted to support the feet of the user and having an opening therein, a hinged closure for said opening, and means on said closure for raising it, said means when the closure is raised forming a brace for the user.

7. A portable latrine including a receptacle, a platform-like cover therefor adapted to support the feet of the user and having an opening, a closure for said opening, and means adapted to be engaged by the feet and hands of the user for bracing the position of the body.

8. A portable latrine including a receptacle, a cover therefor having an opening, a hinged closure for said opening, a hand-hold on said closure for lifting it, and means on said cover for engaging the feet of the user, said last mentioned means and said hand-hold forming a means for bracing the position of the body.

9. A portable latrine including a receptacle, a cover therefor having an opening, a hinged closure for said opening, members extending laterally beyond the sides of said closure near one end for raising it, a foot-hold on the cover at each side of said opening, the latter and the laterally extending members of the closure forming a means for bracing the position of the body.

10. A portable latrine including a receptacle, a cover therefor having an opening, a hinged closure for said opening, a bar extending transversely of said closure near one end and having its extremities deflected upwardly and extending beyond the sides of the closure, a foot-hold at each side of said opening, the latter and said bar forming a means for bracing the position of the boy.

11. A portable latrine including a receptacle, a cover therefor adapted to support the feet of the user and having an opening, a closure for said opening hinged to the cover, said closure having a portion extending within said opening adjacent its hinged end, and stops on said cover with which said inwardly projecting portion of the closure is adapted to engage to limit the opening movement of the closure.

In testimony whereof I have signed this specification.

JAMES GARFIELD McILROY.

Copies of this patent may be obtained for five cents each, by addressing the "Commissioner of Patents, Washington, D. C."